United States Patent
Tamai et al.

(10) Patent No.: US 6,327,095 B1
(45) Date of Patent: Dec. 4, 2001

(54) VEHICLE LAMP AND METHOD FOR MANUFACTURING THE SAME

(75) Inventors: Hiroyuki Tamai; Hideo Taki, both of Shizuoka (JP)

(73) Assignee: Koito Manufacturing Co., Ltd. (JP)

(*) Notice: Subject to any disclaimer, the term of this patent is extended or adjusted under 35 U.S.C. 154(b) by 0 days.

(21) Appl. No.: 09/520,499

(22) Filed: Mar. 8, 2000

(30) Foreign Application Priority Data

Mar. 10, 1999 (JP) .................................................. 11-063355

(51) Int. Cl.[7] .......................... G02B 11/00; G02B 5/126; B29D 11/00; F21V 5/00
(52) U.S. Cl. ........................ 359/642; 359/535; 359/542; 264/1.1; 362/522; 362/507
(58) Field of Search ................................... 362/487, 507, 362/509, 520, 522, 544, 360; 359/535, 542, 642, 796; 264/1.1, 478, 246, 247

(56) References Cited

U.S. PATENT DOCUMENTS

| 4,812,955 | * | 3/1989 | Beswick et al. ..................... 362/240 |
| 4,849,861 | | 7/1989 | Arima ..................................... 362/61 |
| 5,552,969 | * | 9/1996 | Murakami ............................... 362/61 |
| 5,642,228 | | 6/1997 | Takezawa et al. .................... 359/642 |
| 5,658,072 | | 8/1997 | Natsume et al. ...................... 362/331 |
| 5,836,674 | | 11/1998 | Nishitani et al. ..................... 362/336 |
| 6,170,972 | * | 1/2001 | Fukuhara .............................. 362/544 |

FOREIGN PATENT DOCUMENTS

| 10-69804-A | * | 3/1998 | (JP) . |
| 10-334707-A | * | 12/1998 | (JP) . |
| 2000-21214-A | * | 1/2000 | (JP) . |

* cited by examiner

Primary Examiner—Evelyn A Lister
(74) Attorney, Agent, or Firm—Richard & Richard P.C.

(57) ABSTRACT

To provide a vehicle lamp having a high quality lens and a method for manufacturing the same and make it possible to reliably separate a pre-molded lens member while being securely held in the movable die during composite lens molding in a multi-color molding process.

6 Claims, 6 Drawing Sheets

FIG. 4 - (a)
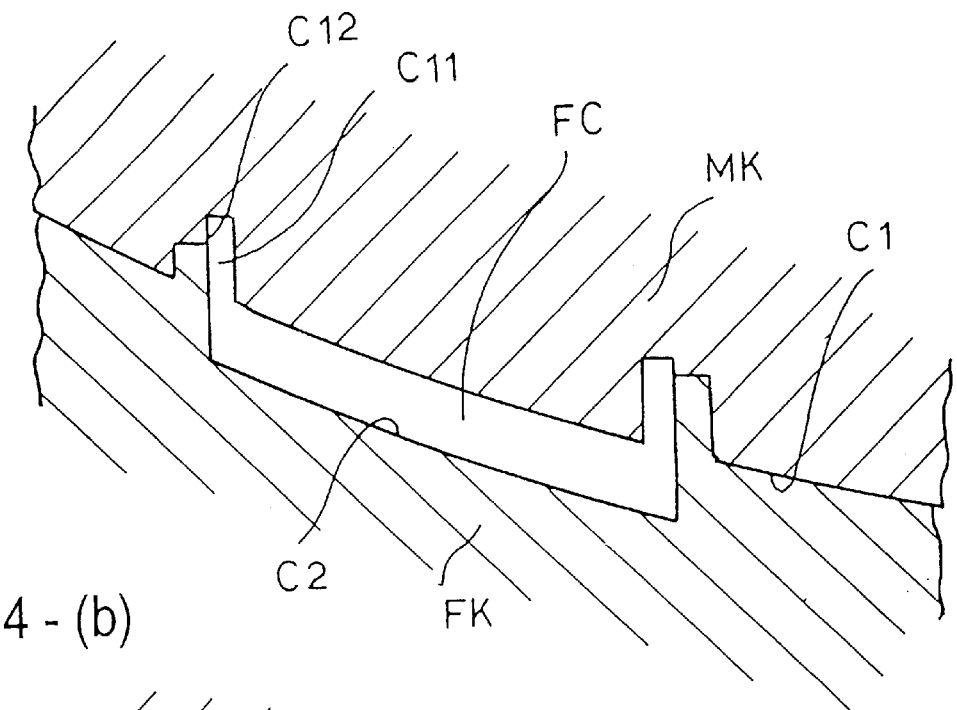
FIG. 4 - (b)
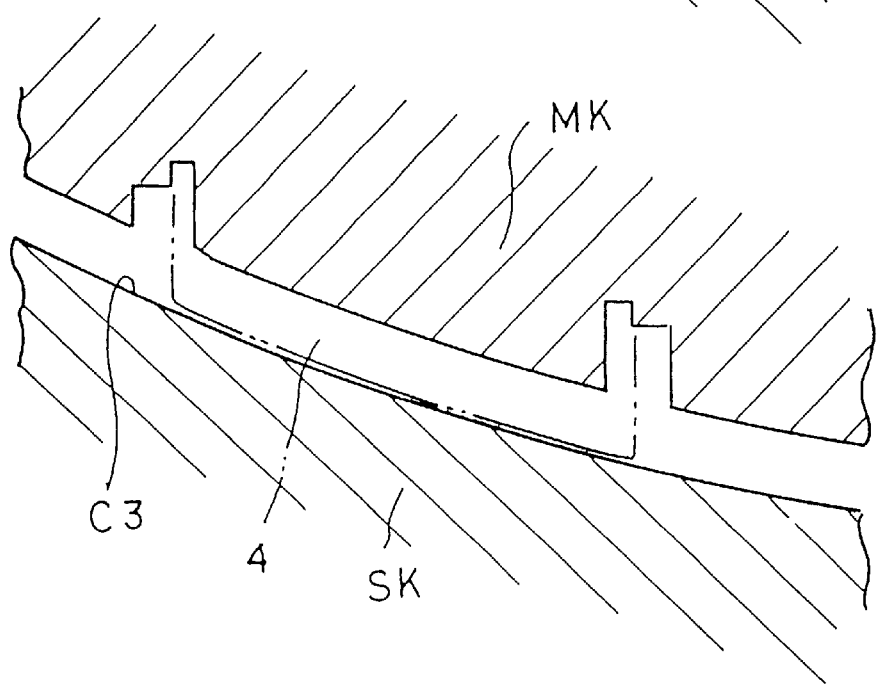

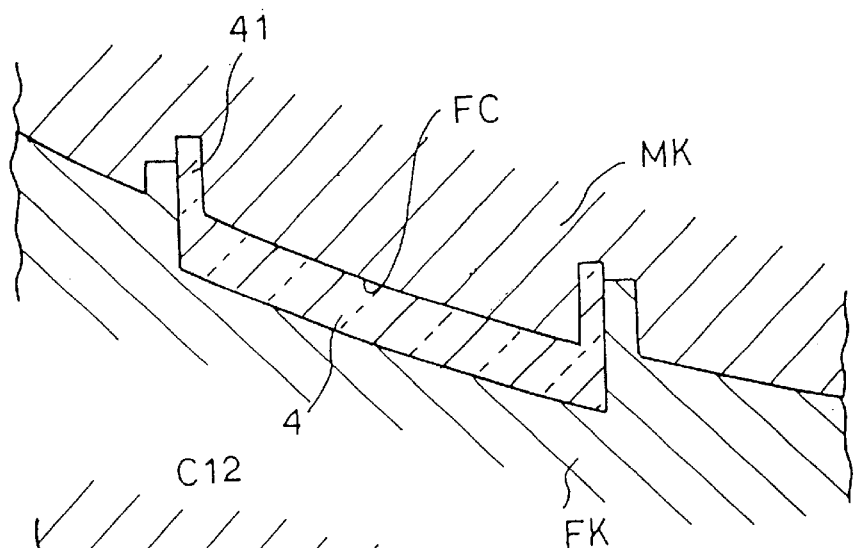
FIG. 5 - (a)
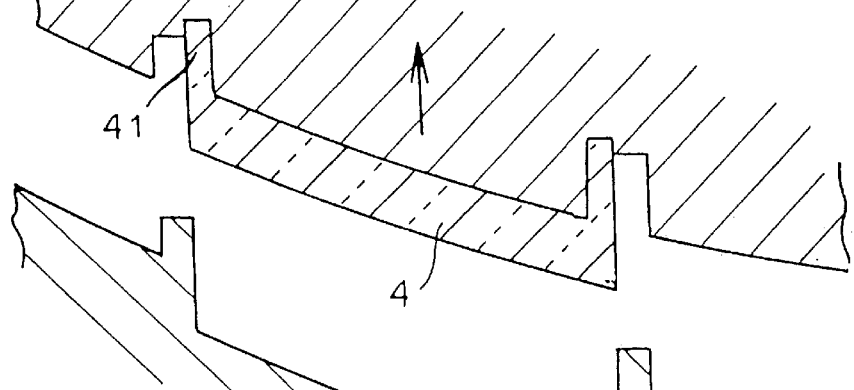
FIG. 5 - (b)
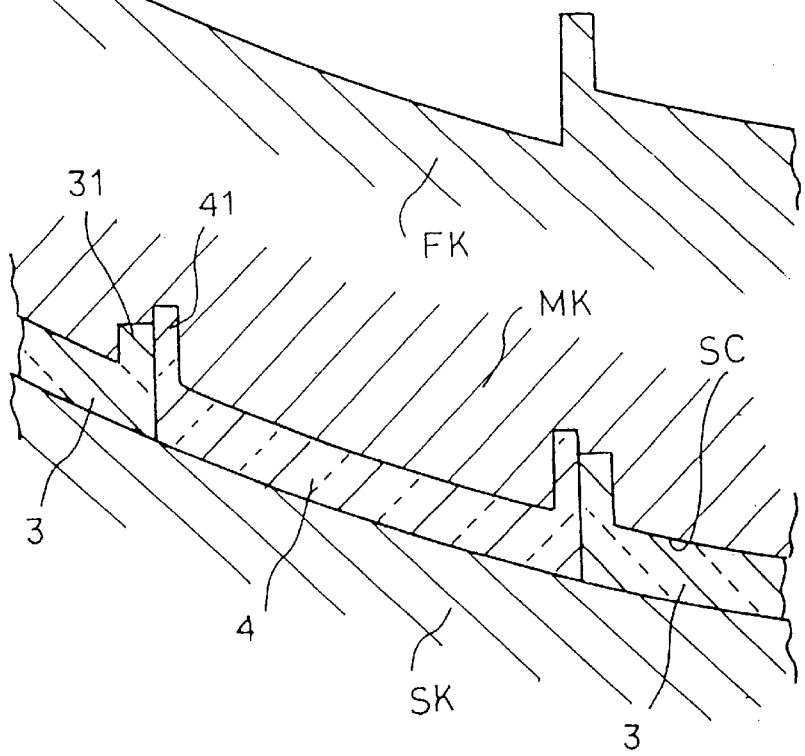
FIG. 5 - (c)

FIG. 6 - (a)
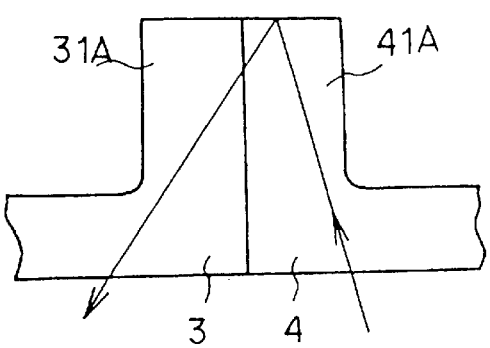
FIG. 6 - (b)
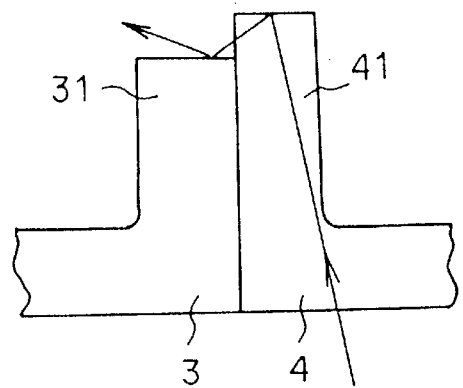

VEHICLE LAMP AND METHOD FOR MANUFACTURING THE SAME

TECHNICAL FIELD OF THE INVENTION

The present invention relates to a vehicle lamp having a composite lens formed by integrally molding a plurality of lens members and to a method for manufacturing the vehicle lamp.

BACKGROUND OF THE INVENTION

In a lamp such as a rear combination lamp for a motor vehicle, which has auxiliary lamps each with a plurality of functions, the lens fitted to the front opening of the lamp body is formed by integrally molding differently colored resin lens members corresponding to the respective auxiliary lamps. The composite lens described above has been formed generally through a molding process called multi-color molding. In this process, one lens member is molded using a predetermined color resin in a die, and then another lens member is further molded with a different color resin in another die while the first molded lens member is set therein. The lens obtained is a composite lens formed by combining one lens member with another.

The resin molding process first performed is referred to as "pre-molding," and the resin molding process performed next is referred to as "post-molding." A composite lens for a rear combination lamp is formed by integrating a red lens for a tail & stop lamp and a white (clear) lens for a backup lamp. For manufacturing this composite lens, the white lens is first formed in the pre-molding process and the red lens is formed with the pre-molded white lens in the post-molding process. Each of the pre-molded lens (the white lens) and the post-molded lens (the red lens) has projection ribs, projecting from the lens surface along the boundary where the respective lens members are bonded at their respective sides to integrate the members tightly.

In forming a composite lens, an upper movable die and a lower pre-molding die are used for molding a pre-molded lens, and the same upper movable die and a lower post-molding die are used for molding a post-molded lens.

The molding of the pre-molded lens is accomplished by bringing the movable die into contact with the pre-molding die. The formed pre-molded lens is separated from the pre-molding die while being held in the movable die. Then, the movable die is brought into contact with the post-molding die to mold the post-molded lens next to the pre-molded lens.

However, a problem often occurs during the separation process of the movable die from the lower pre-molding die after the pre-molded lens is formed. Because the protection rib of the pre-molded lens contacts the pre-molding die so tightly due to frictional forces, the pre-molded lens remains with the pre-molding die rather than being separated with the movable die. When this happens, the subsequent process cannot be performed, and the formation of a high quality composite lens is prevented.

SUMMARY OF THE INVENTION

The present invention provides a vehicle lamp provided with a high quality lens and a manufacturing process of the same by allowing a pre-molded lens member to separate reliably with a movable die from a lower die.

The vehicle lamp of the present invention is a composite lens formed by bonding a pre-molded lens member to a post-molded lens member, each provided with a projection rib projecting backward from the lens surface along the bonded boundary between the members, where the length of the projection rib of the pre-molded lens member is made longer than that of the projection rib of the post-molded lens member. It is preferable that the thickness of the projection rib of the pre-molded lens member be less than that of the projection rib of the post-molded lens member.

A method for manufacturing a vehicle lamp includes molding a pre-molded lens member using a movable die and a pre-molding die, molding a post-molded lens member to be bonded to the pre-molded lens member using the same movable die and a post-molding die, and forming a composite lens by integrating the pre-molded and post-molded lens members. A projection rib of a predetermined length projecting backward from the lens surface of the pre-molded lens member is integrally molded during the molding process of the pre-molded lens member, and a projection rib of a length less than that of the projection rib of the pre-molded lens member is integrally molded within the post-molded lens member during the molding process of the post-molded lens member. The projection rib of the pre-molded lens member and the projection rib of the post-molded lens member are bonded together.

The length of the projection rib of the pre-molded lens member is made longer than that of the projection rib of the post-molded lens member. As a result, when molding the composite lens through the process using the movable die, the pre-molding die, and the post-molding die, the projection rib and the movable die can form a tight contact during molding of the pre-molded lens member. Therefore, the pre-molded lens member can be securely held in the movable die, thus preventing molding failure. Additionally, denting caused by forming the projection rib is prevented and the appearance of the lamp is improved.

BRIEF DESCRIPTION OF THE DRAWINGS

FIG. 4 is a sectional view of a portion of a molding apparatus employed in the present invention.

FIG. 5 illustrates a process for molding a lens of the present invention.

FIG. 6 is a sectional view of a portion illustrating an advantageous effect of the present invention.

DETAILED DESCRIPTION OF THE INVENTION

Figure 1:
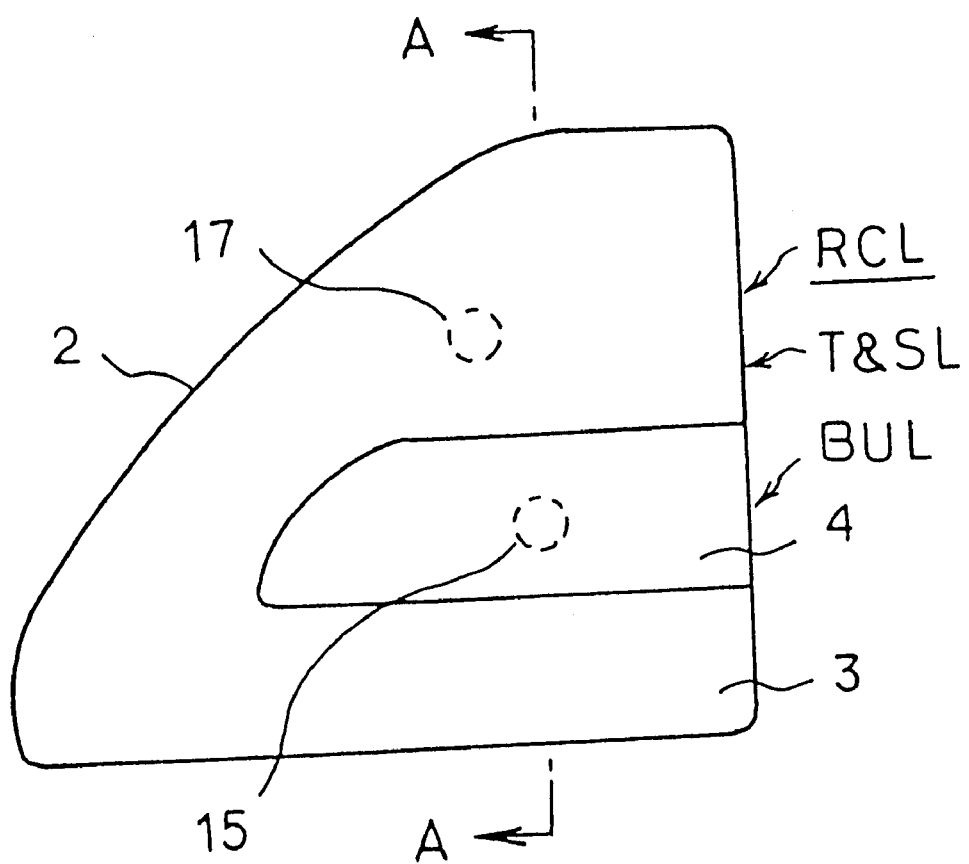
FIG. 1 is a front view of a lamp of an embodiment of the present invention.
Figure 2:
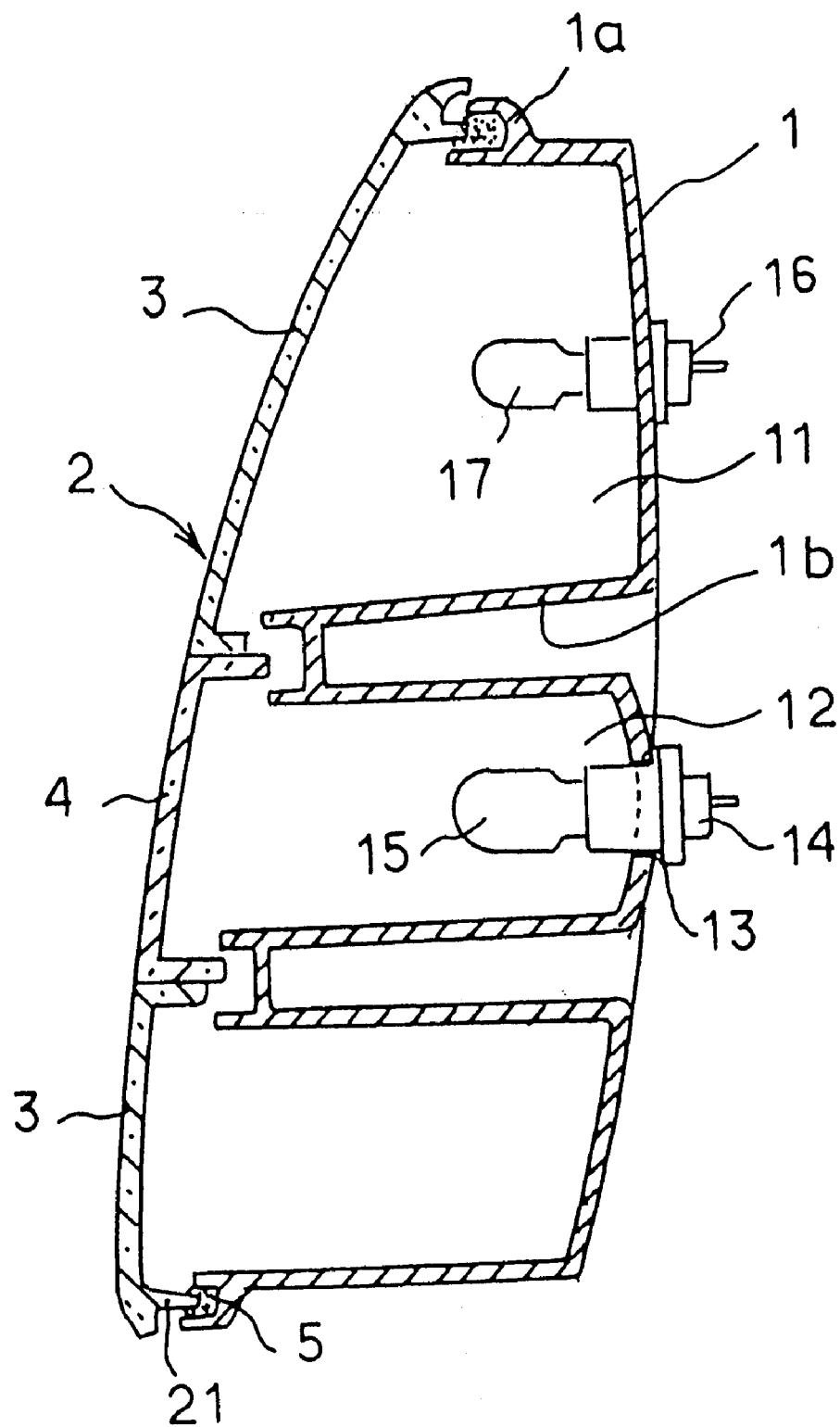
FIG. 2 is an enlarged sectional view along line A—A of FIG. 1.

The present invention will be described by referring to accompanying drawings. FIG. 1 is a front view of an embodiment in which a vehicle lamp of the present invention is used as a rear combination lamp of a motor vehicle. FIG. 2 is a sectional view taken along line A—A of FIG. 1. This embodiment represents the application of a rear combination lamp RCL formed by combining a tail & stop lamp T&SL and a backup lamp BUL. A composite lens 2, which is integrally formed by a red lens member 3 and a white lens member 4 corresponding to the respective lamps T&SL and BUL, is fitted into a front opening of a lamp body 1. A seal leg 21 formed at the edge of the composite lens is sealed with a sealing agent 5 within a seal groove 1a formed in the opening edge of the lamp body 1. A shade 1b projecting forward along the periphery of the backup lamp BUL, is integrally formed with the inner surface of the lamp body 1, by which the inside of the lamp body 1 is separated into lamp chambers 11 and 12 for the respective lamps T&SL and BUL. In the lamp chamber 12 of the backup lamp BUL, a light bulb 15 is supported by a bulb socket 14 fitted in a bulb fitting hole 13 formed in a rear surface of the lamp body 1. Likewise, a light bulb 17 is supported by a bulb socket 16 in the lamp chamber 11 of the tail & stop lamp T&SL.

Figure 3:
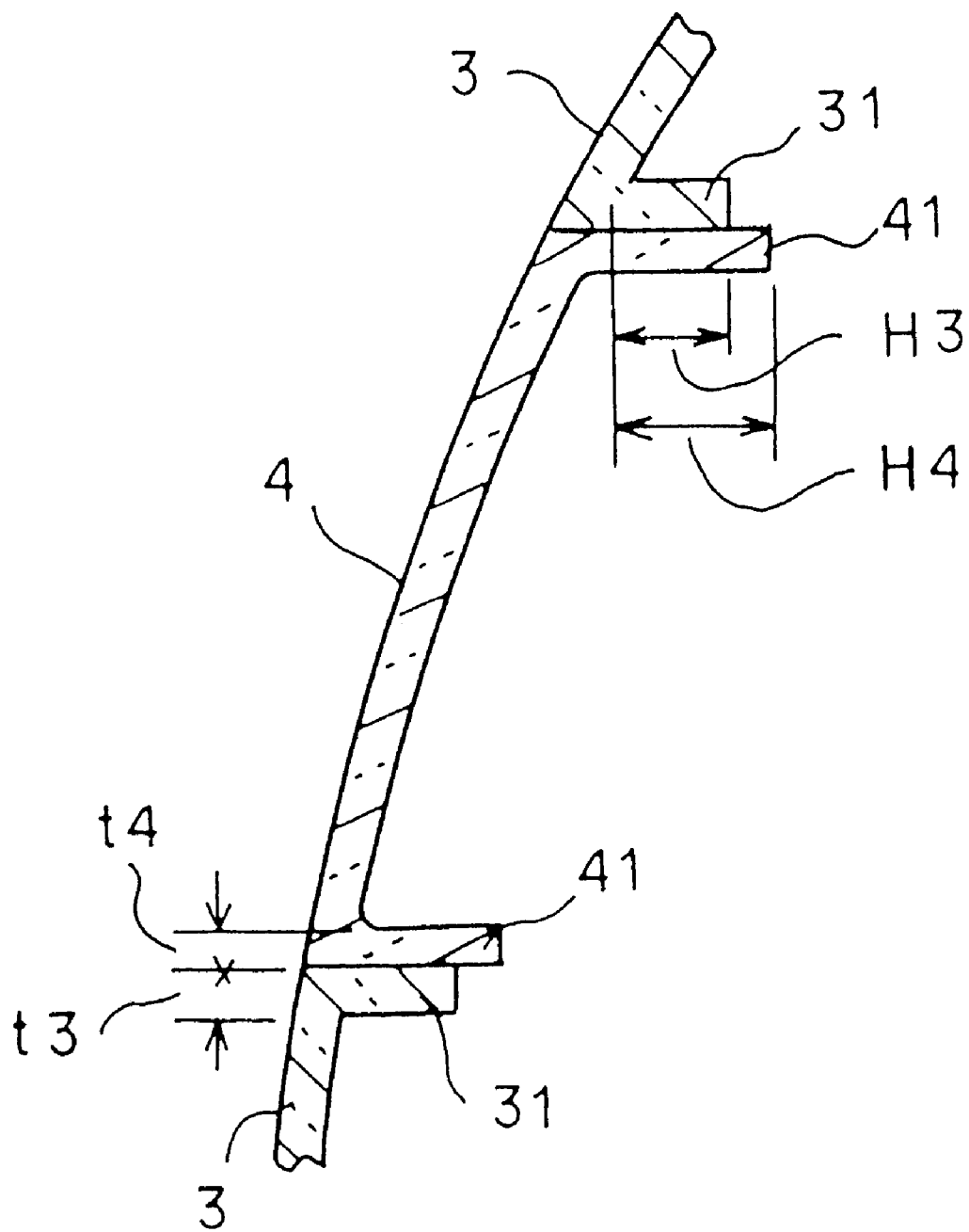
FIG. 3 is an enlarged sectional view of a portion shown in FIG. 2.

FIG. 3 illustrates an enlarged sectional view of the area containing the white lens member 4 integrated with the red lens member 3. The composite lens 2 is formed by the lens members 3 and 4, flush with each other to form a flat surface. Projection ribs 31 and 41 projecting substantially perpendicular to the lens surface are formed at the boundary portions of each of the lens members 3 and 4 on the respective inside surfaces thereof. The lens members 3 and 4 are connected by bonding at the side surfaces of those projection ribs 31 and 41. The length H4 of the projection rib 41 of the white lens member 4, that is, the projection length from the lens surface, is made longer than the length H3 of the projection rib 31 of the red lens member 3. As a result, the leading end of the projection rib 41 of the white lens member 4 projects farther than that of the projection rib 31 of the red lens member 3. Meanwhile, the thickness t4 of the projection rib 41 of the white lens member 4 is made less than the thickness t3 of the projection rib 31 of the red lens member 31.

FIG. 4 illustrates how the composite lens described above is produced. Generally, the composite lens is formed using a molding apparatus including a movable die MK, a pre-molding die FK, and a post-molding die SK. The white lens member 4 is molded as a pre-molded lens member, and the red lens member 3 is molded as a post-molded lens member. The movable die MK is configured to have a cavity surface C1 for molding the pre-molded lens member 4 and the post-molded lens member 3. The pre-molding die FK has a cavity FC for molding the pre-molded lens member 4 with the movable die MK and is configured to have a cavity surface C2 that takes up the cavity portion for molding the post-molded lens member 3 by abutting against the die surface of the movable die MK. The post-molding die SK having a cavity surface C3 is used with the movable die MK together with the pre-molded lens member 4 to mold the post-molded lens member 3. A portion C11 of the cavity surface C1 of the movable die MK for forming the projection rib 41 of the white lens member 4 includes a portion C12, the length of which corresponds to the difference of the length between the projection ribs 31 and 41 of the white and red lens members 4 and 3, respectively.

In FIG. 5(a), the white lens member 4 as a pre-molded lens member is molded with a resin within the cavity FC by bringing the movable die into contact with the pre-molding die FK. Then the molded white lens member 4 is separated from the pre-molding die FK while being held in the movable die MK as shown in FIG. 5(b). At this point, the outer surface of the leading end of the projection rib 41 is in contact with a portion C12 of the cavity surface of the movable die MK. The increased contact area between the projection rib 41 of the white lens member 4 and the cavity surface C1 of the movable die MK by having the movable die MK accommodate the projection rib 41 that is longer than the projection rib 31 provides for the white lens member 4 to be securely held by the movable die MK. In FIG. 5(c), the movable die MK is brought into contact with the post-molding die SK to mold the red lens member 3 as a post-molded lens member within the cavity SC, excluding the space for the pre-molded lens member 4. By post-molding, the outer surface of the projection rib 41 of the white lens member 4 is bonded to the side surface of the projection rib 31 of the red lens member 3, thus molding the composite lens 2. Since the length of the projection rib 41 of the pre-molded lens member 4 is made longer than that of the projection rib 31 of the post-molded lens member 3, the pre-molded lens member 4 is securely held in the movable die MK during separation of the movable die MK. The pre-molded lens member 4 does not remain in the pre-molding die FK. In this way, molding failure is prevented and the manufacturing process is improved.

In another embodiment, the projection rib 41 of the white lens member 4 as a pre-molded lens member can be made thinner than the projection rib 31 of the red lens member 3 as a post-molded lens member such that the volume of that rib 41 does not increase even when the length thereof is made longer as mentioned above. Therefore, denting, that is, a recess-like deformation is unlikely to occur on the surface of the front portion of the projection rib 41 of the white lens member 4 during molding with a resin, such that a high quality lens with excellent appearance can be formed. If the thickness of the projection rib 41 of the white lens member 4 is equal to or greater than that of the projection rib 31 of the red lens member 3, the volume of the projection rib 41 of the white lens member 4 increases, which might cause denting on the lens surface opposite the projection rib 41.

Since the projection ribs 31 and 41 of the white lens member 4 and the red lens member 3 are different in lengths, the respective leading ends are not level with each other. In FIG. 6(a), in the case of a conventional structure having the leading ends of the projection ribs 31A and 41A located on the same plane, the light from the outside radiating into the projection rib 41A of the white lens member 4 is reflected by the leading end surface thereof and is radiated to the projection rib 31 of the red lens member 3 after passing through the bonded surface. Therefore, the bonded surfaces of the red lens member 3 and the white lens member 4 become excessively luminous. In the case of the present invention in FIG. 6(b), the light radiated to the projection rib 41 of the white lens member 4 and reflected by the leading end surface thereof is further reflected by the leading end surface of the projection rib 31 of the red lens member 3. As a result, the light is not radiated to the front side of the red lens member 3 such that the appearance is not deteriorated as mentioned above. There is even a greater problem in the reverse case where the red lens member is formed as a pre-molded lens member and the white lens member is formed as a post-molded lens member. The reflected light may cause the portion around the bonded surfaces of the white lens member and the red lens member to appear red, thus significantly deteriorating the appearance. On the other hand, the present invention prevents the corresponding region of the white lens member from appearing red.

The present invention has been described with an embodiment in which it is applied to a rear combination lamp formed by integrating the tail & stop lamp and the backup lamp for a motor vehicle. Alternatively, the present invention can also be applied in the same manner to a combination lamp formed by integrating other types of lamps, or three or more lamps through the multi-color molding process for molding each lens corresponding to the respective lamps, thereby providing a high quality lens.

In the present invention, the length of the projection rib of the pre-molded lens member is longer than that of the projection rib of the post-molded lens member to be integrated therewith. When molding the composite lens through the molding process using the movable die, the pre-molding die, and the post-molding die, the tightness between the projection rib and the movable die during molding of the pre-molded lens member can be enhanced such that the pre-molded lens member can be securely held in the movable die. As a result, molding failure can be prevented. Furthermore, since the projection rib of the pre-molded lens member is made thinner than the projection rib of the post-molded lens member, denting caused by forming the projection rib can be prevented. The present invention makes it possible to provide a vehicle lamp with a high quality lens.

What is claimed is:

1. A vehicle lamp comprising:

a composite lens having a pre-molded lens member and a post-molded lens member; each of the pre-molded lens member and the post-molded lens member provided with a projection rib projecting backward from the respective surfaces of the members; the projection rib of the pre-molded lens member being bonded to the projection member of post-molded lens member; wherein the length of the projection rib of the pre-molded lens member is made longer than that of the projection rib of the post-molded lens member.

2. A vehicle lamp according to claim 1, wherein that the thickness of the projection rib of the pre-molded lens member is less than that of the projection rib of the post-molded lens member.

3. An method for manufacturing a vehicle lamp comprising;

molding a pre-molded lens member using a movable die and a pre-molding die;

molding a post-molded lens member to be bonded to the pre-molded lens member using the movable die and a post-molding die; and forming a composite lens by integrating the pre-molded and post-molded lens members, wherein during molding the pre-molding lens member, a projection rib of a predetermined length projecting backward from the surface of the pre-molding lens member is formed; and during molding the post-molding lens member, a projection rib of a length less than that of the projection rib of the pre-molded lens member is formed projecting backward from the surface of the post-molding lens member.

4. The method of claim 3, further comprising: during molding the post-molding lens member, bonding the projection rib of the post-molding lens member to the projection rib of the pre-molding lens member.

5. The method of claim 3, further comprising: after molding the pre-molding lens member, holding the pre-molded lens member to the movable die as the movable die separates from the pre-molding die.

6. The method of claim 3, further comprising: during molding the post-molding lens member, retaining the pre-molded lens member between the movable die and the post-molding die while the post-molded lens member is formed next to the pre-molded lens member.

* * * * *